United States Patent
Fukano et al.

[11] Patent Number: 5,779,224
[45] Date of Patent: Jul. 14, 1998

[54] POPPET VALVE

[75] Inventors: Yoshihiro Fukano; Tetsuro Maruyama; Tadashi Uchino; Masaaki Ono; Yuzuru Okita, all of Ibaraki-ken, Japan

[73] Assignee: SMC Kabushiki Kaisha, Tokyo, Japan

[21] Appl. No.: 804,733

[22] Filed: Feb. 21, 1997

[30] Foreign Application Priority Data

Feb. 22, 1996 [JP] Japan .................................. 8-035295

[51] Int. Cl.⁶ .................................................. F16K 7/17
[52] U.S. Cl. ........................................ 251/331; 251/64
[58] Field of Search ................... 251/331, 64, 335.2, 251/63.5, 63.6

[56] References Cited

U.S. PATENT DOCUMENTS

| | | |
|---|---|---|
| 3,128,632 | 4/1964 | Green . |
| 5,002,086 | 3/1991 | Linder et al. . |
| 5,131,627 | 7/1992 | Kolenc .................... 251/331 |
| 5,370,355 | 12/1994 | Rombold et al. .......... 251/64 |
| 5,427,352 | 6/1995 | Brehm ..................... 251/64 |

FOREIGN PATENT DOCUMENTS

| | | |
|---|---|---|
| 0 246 584 | 11/1987 | European Pat. Off. . |
| 1 125 618 | 11/1956 | France . |
| 1065238 | 9/1959 | Germany ................ 251/331 |
| 430 399 | 4/1937 | United Kingdom . |

*Primary Examiner*—Kevin Lee
*Attorney, Agent, or Firm*—Oblon, Spivak, McClelland, Maier & Neustadt, P.C.

[57] ABSTRACT

A two-way valve has a poppet valve displaceably disposed in a bonnet for selectively opening and closing a communication passage between primary and secondary ports, and a resilient member disposed in a diaphragm chamber defined between the bonnet and the poppet valve and resiliently deformable for dampening a load applied to a diaphragm of the poppet valve which is exposed to the communication passage.

19 Claims, 5 Drawing Sheets

5,779,224

POPPET VALVE

BACKGROUND OF THE INVENTION

1. Field of the Invention

The present invention relates to a poppet valve for bringing primary and secondary ports into and out of communication with each other in response to flexing displacement of a diaphragm.

2. Description of the Related Art

FIG. 5 of the accompanying drawings shows a poppet valve which has been proposed by the applicant of the present application.

As shown in FIG. 5, the poppet valve, generally denoted by 1, includes a valve casing 4 having primary and secondary ports 2, 3, and a bonnet 5 connected to an upper portion of the valve casing 4. The valve casing 4 has a communication passage 6 defined therein which provides fluid communication between the primary and secondary ports 2, 3. The communication passage 6 is selectively opened and closed by a diaphragm 7. The bonnet 5 has first and second pressure fluid inlet/outlet ports 8, 9 defined therein which are connected to a pressure fluid source (not shown) for supplying a fluid under pressure from the pressure fluid source in response to switching operation of a directional control valve (not shown).

A piston 10 is displaceably housed in a chamber defined in the bonnet 5. The diaphragm 7 has a central boss fitted in an end of the piston 10. The piston 10 and the diaphragm 7 are vertically displaced in unison with each other under the pressure of a fluid supplied from either the first pressure fluid inlet/outlet port 8 or the second pressure fluid inlet/outlet port 9.

When the piston 10 is thus displaced upwardly in FIG. 5, the diaphragm 7 is spaced a given distance from a valve seat 11, the communication passage 6 is opened, bringing the primary and secondary ports 2, 3 into fluid communication with each other. When piston 10 is thus displaced downwardly in FIG. 5, the diaphragm 7 is seated on the valve seat 11, closing the communication passage 6 thereby to bring the primary and secondary ports 2, 3 out of fluid communication with each other. The piston 10 is normally urged to move downwardly under the bias of a spring 12 which is disposed in the chamber in the bonnet 5.

One problem of the poppet valve 1 is that a thin portion 13 of the diaphragm 7 tends to flex as indicated by the two-dot-and-dash lines under an excessive load due to a back pressure A applied by the fluid supplied to the secondary port 3. During long usage of the poppet valve 1, the durability of the diaphragm 7 is undesirably lowered.

SUMMARY OF THE INVENTION

It is a general object of the present invention to provide a poppet valve which incorporates a diaphragm and has a structure for increasing the durability of the diaphragm.

A major object of the present invention is to provide a poppet valve which is capable of dampening an excessive load imposed on a diaphragm when the diaphragm is subject to a back pressure.

Another object of the present invention is to provide a poppet valve which has a highly durable diaphragm that can flex to pass and cut off the flow of a fluid.

The above and other objects, features and advantages of the present invention will become more apparent from the following description when taken in conjunction with the accompanying drawings in which preferred embodiments of the present invention are shown by way of illustrative example.

DETAILED DESCRIPTION OF THE PREFERRED EMBODIMENTS

Figure 1:
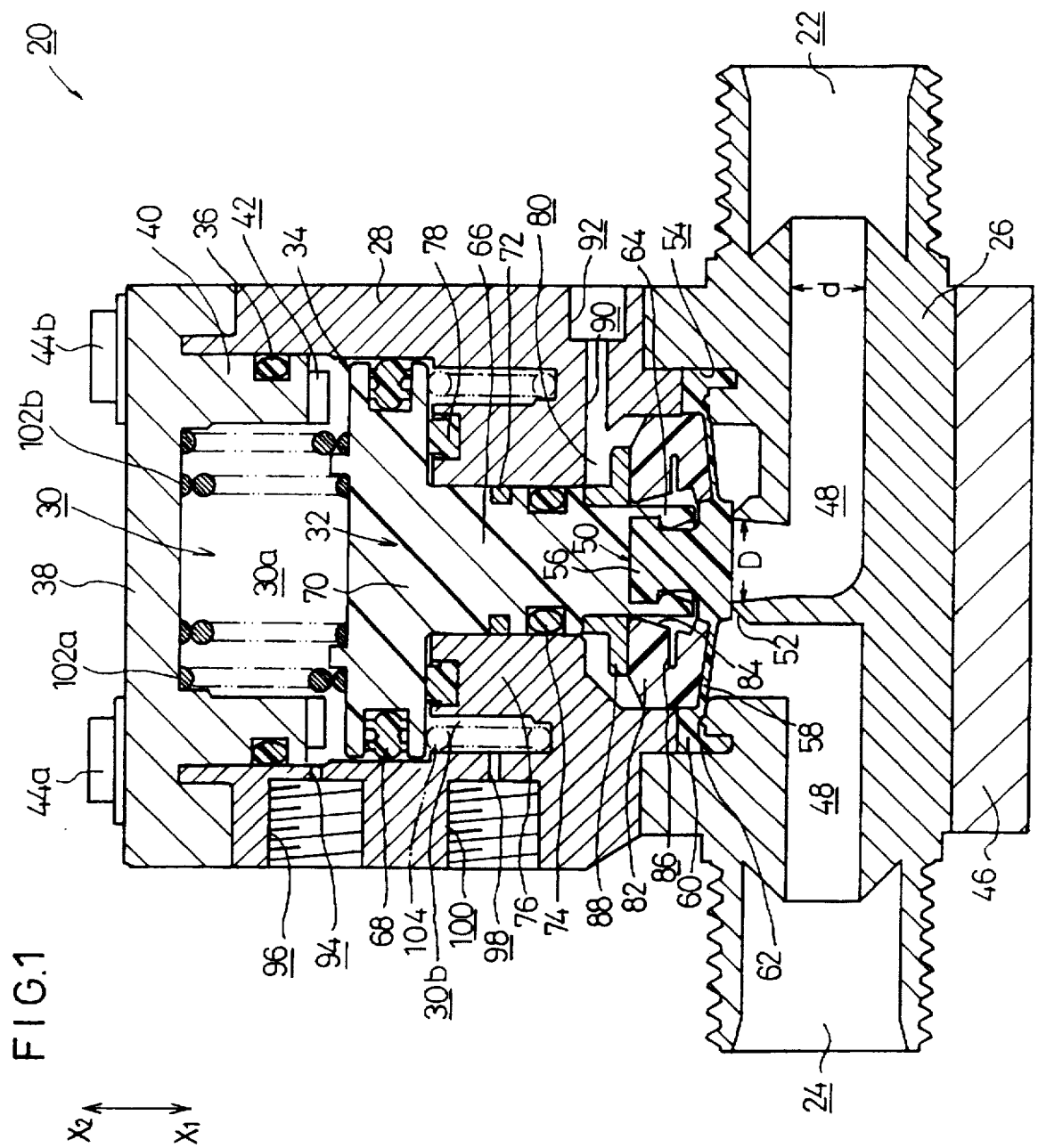
FIG. 1 is a vertical cross-sectional view of a two-way valve which incorporates a poppet valve according to the present invention.
Figure 2:
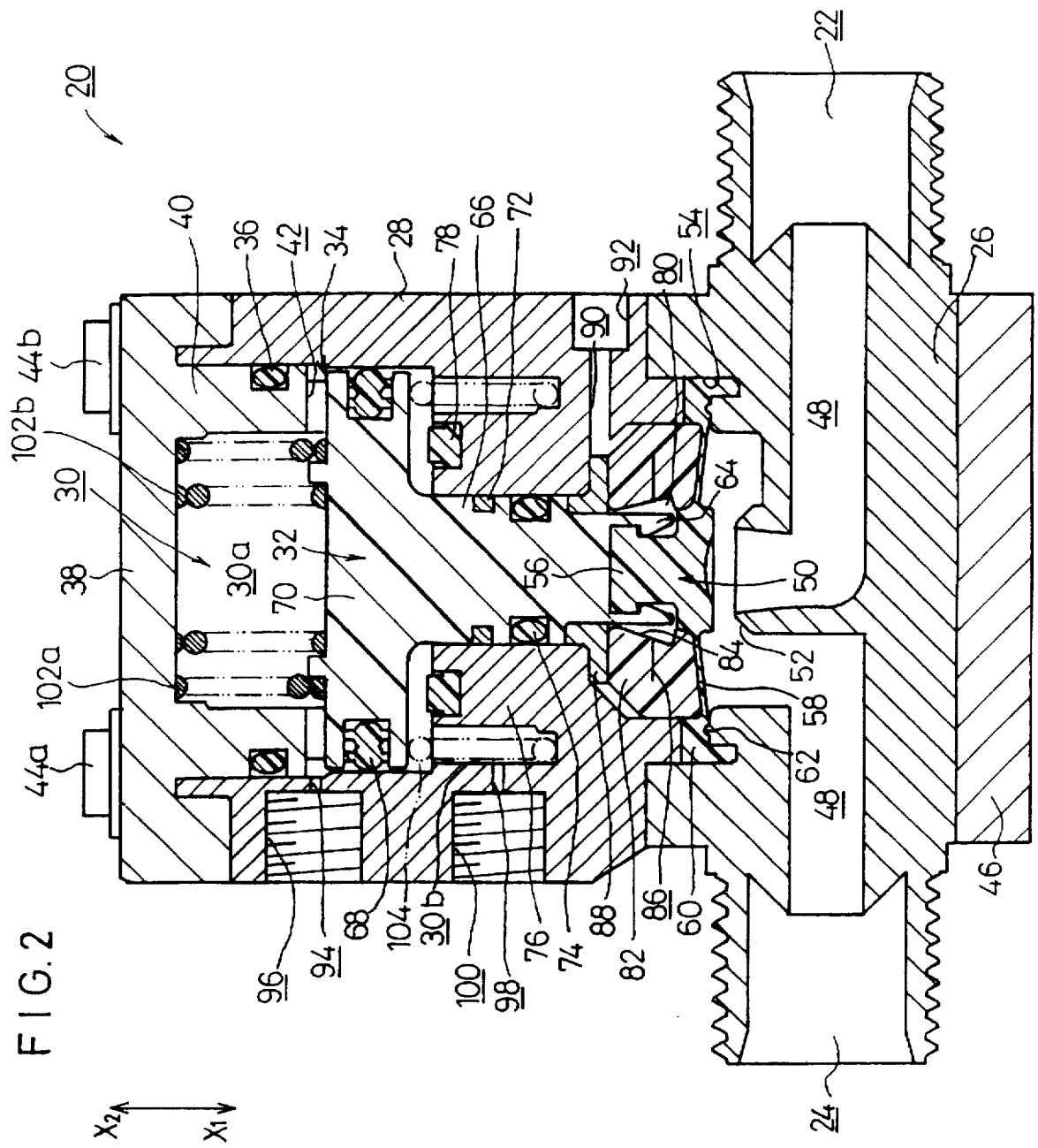
FIG. 2 is a vertical cross-sectional view of the two-way valve shown in FIG. 1 in which a fluid communication passage defined therein are opened by a diaphragm.

As shown in FIGS. 1 and 2, a two-way valve 20 which incorporates a poppet valve according to the present invention basically comprises a valve casing 26 having primary and secondary ports 22, 24 defined therein which are coaxially aligned with and opposite to each other, a bonnet 28 hermetically connected to an upper portion of the valve casing 26, a cylinder mechanism 34 having a piston 32 slidably displaceable in the directions indicated by the arrows $X_1$, $X_2$ along the wall surface of a cylinder chamber 30 which is defined in the bonnet 28, and a cover 38 connected to an upper end of the bonnet 28 through a seal 36 and closing the cylinder chamber 30. The valve casing 26 and the bonnet 28 jointly serve as a valve body. The two-way valve 20 is fastened to a base 46 by a pair of bolts 44a, 44b which extend through the valve body and are threaded in the base 46.

The cover 38 has an annular wall 40 projecting downwardly into the bonnet 28. The annular wall 40 has a plurality of slits 42 defined therein at one circumferential position and spaced radially from each other.

The valve casing 26 has a communication passage 48 defined therein for providing fluid communication between the primary and secondary ports 22, 24. The valve casing 26 also has an upwardly projecting valve seat 52 positioned substantially centrally therein for seating thereon a poppet valve 50 which will be described later on. The communication passage 48 includes a horizontal linear region extending from the primary port 22 and having a diameter "d" and a vertical region extending upwardly substantially perpendicularly to the horizontal linear region and having a diameter "D". The diameters "d", "D" are related to each other to satisfy the relationship: d<D. With this diameter relationship, it is possible to reduce a pressure loss of a fluid flowing under pressure from the primary port 22 to the secondary port 24 through the communication passage 48.

Figure 3:
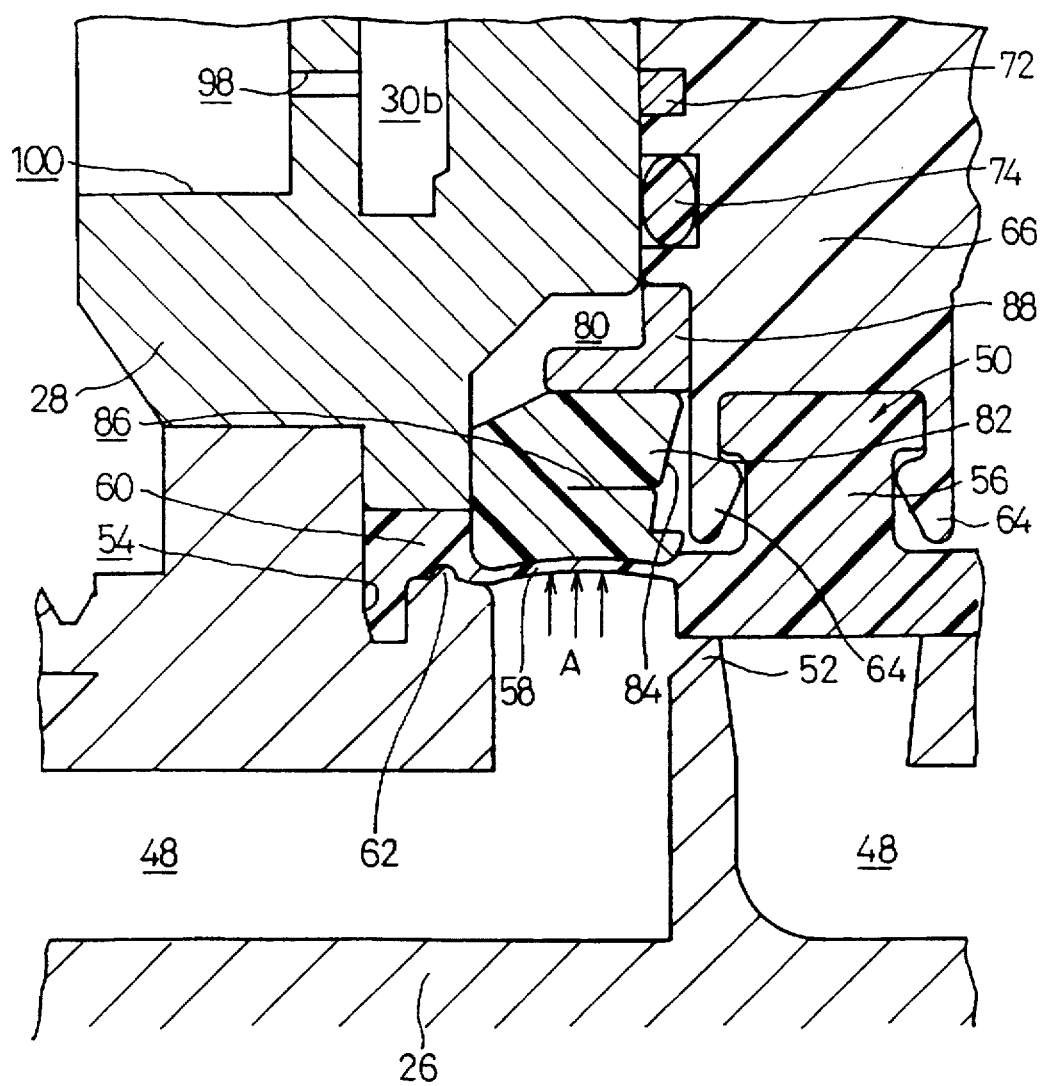
FIG. 3 is an enlarged fragmentary cross-sectional view of the two-way valve shown in FIG. 1, showing the manner in which a back pressure is applied to the diaphragm and the fluid communication passage are closed.

Between the valve casing 26 and the bonnet 28, there is defined an annular groove 54 which receives a portion of the poppet valve 50 that can be spaced from the valve seat 52 for opening the communication passage 48 or seated on the valve seat 52 for closing the communication passage 48. The poppet valve 50 comprises a valve element 56 which can be displaced into and out of contact with the valve seat 52, a diaphragm 58 extending radially outwardly from the valve element 56 and flexible under the pressure of a fluid, and a peripheral edge 60 extending around the diaphragm 58 and gripped in the annular groove 54. The valve body 26 has an annular ridge 62 (see FIG. 3) disposed radially inwardly of the annular groove 54 and projecting upwardly. The annular ridge 62 bites into a lower surface of the peripheral edge 60 to prevent a fluid leakage between the peripheral edge 60 and the valve body 26. The valve element 56, the diaphragm 58, and the peripheral edge 60 are integrally formed of a synthetic resin such as polytetrafluoroethylene or the like, or an elastomeric material such as natural rubber or synthetic rubber.

The valve element 56 is fitted in a lower distal end of a rod 66 extending downwardly from the piston 32 of the cylinder mechanism 34. The piston 32 comprises the rod 66 which has a plurality of fingers 64 extending downwardly and fitted in an annular recess defined in the outer circumferential surface of the valve element 56, and a piston 70 integrally joined to the rod 66 and extending radially outwardly. The piston 70 has an annular groove defined in an outer circumferential edge thereof and receiving a seal ring 68 which is slidably held against the wall surface of the cylinder chamber 30. The fingers 64 are divided by slots extending along the outer circumferential surface of the piston 32 at the distal end of the rod 66. Since the piston 32 and the poppet valve 50 are connected to each other by the resiliently flexible fingers 64, the piston 32 and the poppet valve 50 can easily be assembled together.

A wear ring 72 and a seal member 74, which are axially spaced from each other, are mounted in respective annular grooves defined in the outer circumferential surface of the rod 66. The bonnet 28 has an annular guide 76 extending axially therein for guiding the rod 66 of the piston 32. A damper 78 is mounted in a groove defined in the upper surface of the annular guide 76 for dampening shocks produced when the piston 70 hits the annular guide 76.

Between the poppet valve 50 and the bonnet 28, there is defined a diaphragm chamber 80 which houses therein a ring-shaped resilient member 82 surrounding the valve element 56 and having a lower surface held in surface-to-surface contact with the diaphragm 58. The ring-shaped resilient member 82 has a tapered surface 84 on its inner circumferential surface. The tapered surface 84 provides a clearance for receiving the fingers 64 when the fingers 64 are flexed radially outwardly at the time the piston 32 and the poppet valve 50 are assembled together. The ring-shaped resilient member 82 also has an annular radial slit 86 defined therein and extending a predetermined radial distance from the inner circumferential surface radially outwardly but terminating short of the outer circumferential surface of the ring-shaped resilient member 82.

Figure 4:
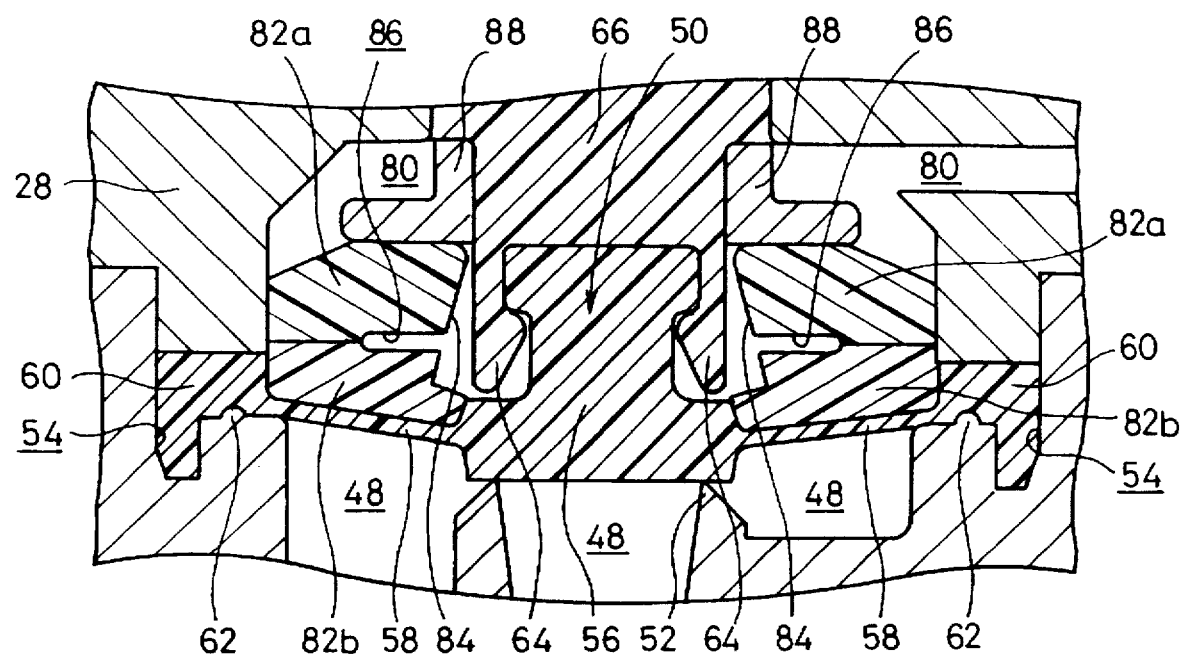
FIG. 4 is an enlarged fragmentary cross-sectional view of a two-way valve which includes a modified resilient member.
Figure 5:
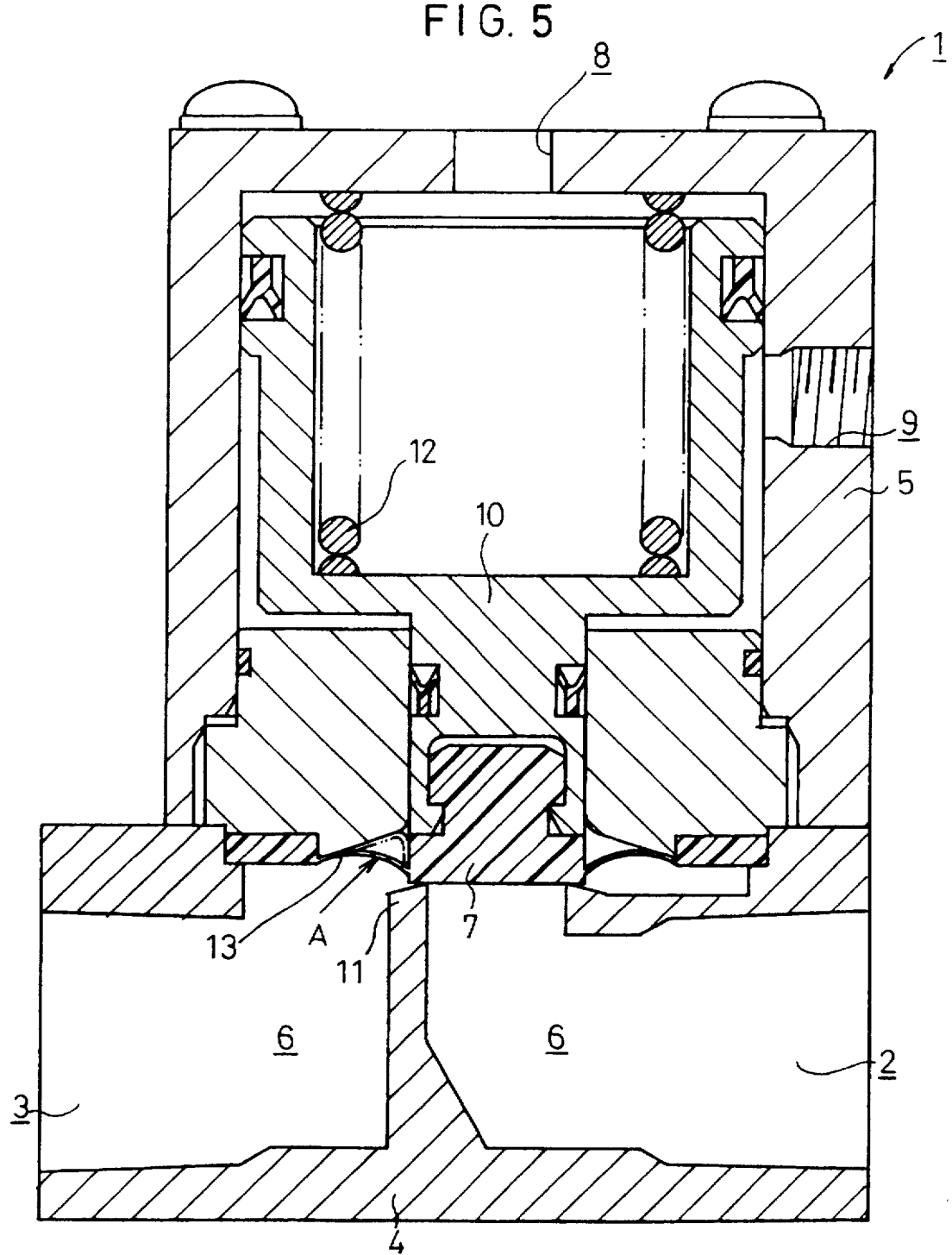
FIG. 5 is a vertical cross-sectional view of a poppet valve which has been proposed by the applicant of the present application.

The ring-shaped resilient member 82 is sandwiched and retained in place axially between a retainer 88 of substantially L-shaped cross section mounted on a stepped portion of the rod 66 at its distal end portion and the diaphragm 58. The ring-shaped resilient member 82 thus positioned is resiliently displaceable in unison with the piston 32 and the poppet valve 50. The ring-shaped resilient member 82 is made of synthetic rubber such as NBR (acrylonitrile-butadiene rubber), urethane rubber, or the like, natural rubber, or the like. The ring-shaped resilient member 82 may be of an integral unitary structure as shown in FIGS. 1 and 2. Alternatively, as shown in FIG. 4, the ring-shaped resilient member 82 may comprise two separate members 82a, 82b divided along the slit 86 and fixed to each other. The members 82a, 82b may have the same hardness or different hardnesses, respectively.

The bonnet 28 has a port 92 defined in an outer circumferential surface thereof and held in communication with the diaphragm chamber 80 through a passage 90, such that the diaphragm chamber 80 is vented to the atmosphere through the port 92. The diaphragm chamber 80 is kept out of communication with the cylinder chamber 30 by the seal member 74.

The cylinder chamber 30 comprises an upper cylinder chamber 30a and a lower cylinder chamber 30b which are axially separated by the piston 70 and the seal ring 68. The upper cylinder chamber 30a is held in communication with a first pressure fluid inlet/outlet port 96 defined in the outer circumferential surface of the bonnet 28 through a slit 42 and a hole 94. The lower cylinder chamber 30b is held in communication with a second pressure fluid inlet/outlet port 100 defined in the outer circumferential surface of the bonnet 28 through a hole 98. The first and second pressure fluid inlet/outlet ports 96, 100 are axially spaced from each other. Therefore, when a fluid is supplied under pressure from a fluid source through a directional control valve (not shown) to either the first pressure fluid inlet/outlet port 96 or the second pressure fluid inlet/outlet port 100, the supplied fluid enters either the upper cylinder chamber 30a or the lower cylinder chamber 30b, axially displacing the piston 32 and the poppet valve 50 in unison with each other in the direction indicated by the arrow $X_1$ or $X_2$. At this time, either the first pressure fluid inlet/outlet port 96 or the second pressure fluid inlet/outlet port 100 which is not supplied with the fluid under pressure is vented to the atmosphere.

When the piston 32 is thus axially displaced in the direction indicated by the arrow $X_2$, the poppet valve 50 is unseated a given distance from the valve seat 52, opening the communication passage 48 thereby to bring the primary and secondary ports 22, 24 into communication with each other. Conversely, when the piston 32 is thus axially displaced in the direction indicated by the arrow $X_1$, the poppet valve 50 is seated on the valve seat 52, closing the communication passage 48 thereby to bring the primary and secondary ports 22, 24 out of communication with each other.

Axially aligned springs 102a, 102b are interposed under compression in the upper cylinder chamber 30a between the piston 32 and the cover 38. The springs 102a, 102b serve to normally bias the piston 32 to move resiliently in the direction indicated by the arrow $X_1$. Therefore, the two-way valve 20 is of the normally closed type with the poppet valve 50 initially seated on the valve seat 52.

The springs 102a, 102b in the upper cylinder chamber 30a may be dispensed with, and another spring 104, indicated by the two-dot-and-dash lines in FIGS. 1 and 2, may be disposed in the lower cylinder chamber 30b around the annular guide 76 for normally biasing the piston 32 to move resiliently in the direction indicated by the arrow $X_2$. In this case, the two-way valve 20 is of the normally open type with the poppet valve 50 initially unseated from the valve seat 52.

According to still another modification, no springs are disposed in the upper and lower cylinder chambers 30a, 30b, and the piton 32 can be displaced in the direction indicated by the arrow $X_1$ or $X_2$ by a fluid supplied under pressure to the first pressure fluid inlet/outlet port 96 or the second pressure fluid inlet/outlet port 100.

The two-way valve 20 of the above structure operates as follows:

The primary port 22 is connected to a first pressure fluid source (not shown), and the secondary port 24 is connected to a fluid pressure device (not shown). The second pressure fluid inlet/outlet port 100 is connected to a second pressure fluid source (not shown) through a directional control valve. The first pressure fluid inlet/outlet port 96 is vented to the atmosphere through the directional control valve.

In an initial position, as shown in FIG. 1, the piston 32 is displaced in the direction indicated by the arrow $X_1$ under the bias of the springs 102a, 102b, causing the poppet valve 50 to be seated on the valve seat 52. The two-way valve 20 is thus normally closed, keeping the primary and secondary ports 22, 24 out of communication with each other.

The second pressure fluid source is then actuated to supply a fluid under pressure through the second pressure fluid inlet/outlet port 100 into the lower cylinder chamber 30b. Under the pressure of the fluid supplied to the lower cylinder chamber 30b, the piston 32 is now displaced in the direction indicated by the arrow $X_2$ against the bias of the springs 102a, 102b.

The valve element 56 and the resilient member 82 surrounding the valve element 56 are axially displaced in unison with each other in the direction indicated by the arrow $X_2$, unseating the poppet valve 50 a given distance off the valve seat 52. The two-way valve 20 is opened, bringing the primary and secondary ports 22, 24 into communication with each other, as shown in FIG. 2. Therefore, when the first pressure fluid source is actuated, a fluid supplied under pressure from the first pressure fluid source is introduced through the primary port 22, the communication passage 48, and the secondary port 24 into the fluid pressure device connected to the secondary port 24. When the poppet valve 50 is displaced in the direction indicated by the arrow $X_2$, the diaphragm 58 and the resilient member 82 are displaced in unison with each other, and the resilient member 82 is elastically deformed or compressed thereby to close the slit 86. As a result, a load which is applied to the diaphragm 58 by the fluid flowing under pressure through the communication passage 48 is absorbed by the resilient member 82, so that the diaphragm 58 is protected from such a load.

When the directional control valve is operated to vent the second pressure fluid inlet/outlet port 100 to the atmosphere, the piston 32, the poppet valve 50, and the resilient member 82 are displaced in the direction indicated by the arrow $X_1$ under the bias of the springs 102a, 102b, causing the poppet valve 50 to be seated back on the valve seat 52 in the initial position (see FIG. 1). Therefore, when the poppet valve 50 is selectively opened and closed by the piston 32, the primary and secondary ports 22, 24 can be brought into and out of fluid communication with each other.

When the fluid supplied under pressure to the secondary port 24 develops a back pressure A as the poppet valve 50 is opened and closed, the back pressure A applies an excessive load on the poppet valve 50, flexing the diaphragm 58. At this time, the resilient member 82 is elastically deformed because the slit 86 is closed due to the flexing of the diaphragm 58. Consequently, the load imposed on the diaphragm 58 is reduced. The resilient member 82 is thus effective to prevent the diaphragm 58 from unduly flexing under such an excessive load. Even if the two-way valve 20 is used over a long period of time, the diaphragm 58 is prevented from being deteriorated too early, and hence the durability of the poppet valve 50 is increased.

In the illustrated embodiment described above, the poppet valve according to the present invention is shown as being incorporated in the two-way valve 20. However, the poppet valve according to the present invention may be incorporated in any of various valves such as a three-way valve.

Although certain preferred embodiments of the present invention have been shown and described in detail, it should be understood that various changes and modifications may be made therein without departing from the scope of the appended claims.

What is claimed is:

1. A poppet valve comprising:
    a valve body having a primary port and a secondary port defined therein for passage therethrough of a fluid under pressure, said valve body having a valve seat and a communication passage between said primary port and said secondary port;
    a valve displaceably disposed in said valve body for being unseated from and seated on said valve seat to open and close said communication passage, said valve having a diaphragm exposed to said communication passage, and defining a diaphragm chamber in said valve body; and
    a resilient member disposed in said diaphragm chamber and resiliently deformable for dampening a load applied to said diaphragm, said resilient member having a slit which can be closed by a load which is applied to said diaphragm to displace said valve.

2. A poppet valve according to claim 1, further comprising a piston slidably disposed in said valve body and connected to said valve, and a retainer fitted over said piston, said resilient member being sandwiched between said retainer and said diaphragm.

3. A poppet valve according to claim 1, wherein said resilient member is made of synthetic rubber including acrylonitrile-butadiene rubber and urethane rubber, or natural rubber, said valve is made of a synthetic resin including polytetrafluoroethylene or an elastomeric material including natural rubber or synthetic rubber.

4. A poppet valve according to claim 2, wherein said piston and said valve are coupled to each other for displacement in unison with each other, further comprising a damper disposed in said valve body for dampening shocks produced when said piston hits said valve body.

5. A poppet valve according to claim 2, wherein said resilient member and said diaphragm are held in surface-to-surface contact with each other.

6. A poppet valve according to claim 2, wherein said valve body has a cylinder chamber defined therein above said piston, further comprising a spring disposed in said cylinder chamber for normally biasing said valve to be seated on said valve seat in an initial position, whereby said poppet valve is of the normally closed type.

7. A poppet valve according to claim 2, wherein said valve body has a cylinder chamber defined therein below said piston, further comprising a spring disposed in said cylinder chamber for normally biasing said valve to be unseated from said valve seat in an initial position, whereby said poppet valve is of the normally open type.

8. A poppet valve according to claim 1, wherein said communication passage includes a linear region extending from said primary port and having a first diameter and a region extending substantially perpendicularly to said linear region and having a second diameter, said second diameter being greater than said first diameter.

9. A poppet valve according to claim 1, wherein said resilient member comprises two separate members divided along said slit and fixed to each other, said separate members having the same hardness or different hardnesses, respectively.

10. A poppet valve according to claim 1, wherein said piston has a finger engaging said valve, said resilient member having a tapered surface on an inner circumferential surface thereof for receiving said finger when said finger is flexed.

11. A poppet valve comprising:
a valve body having a primary port and a secondary port defined therein for passage therethrough of a fluid under pressure, said valve body having a valve seat and a communication passage between said primary port and said secondary port;
a valve comprising a valve element displaceably disposed in said valve body for being unseated from and seated on said valve seat to open and close said communication passage, said valve having a diaphragm extending radially outward from said valve element and exposed to said communication passage, said diaphragm defining a diaphragm chamber in said valve body;
an annular resilient member disposed around said valve element in said diaphragm chamber in contact with said diaphragm and resiliently deformable for dampening a load applied to said diaphragm; and
said resilient member having an annular slit which can be closed by a load which is applied to said diaphragm to displace said valve.

12. A poppet valve according to claim 11, further comprising a piston slidably disposed in said valve body and connected to said valve, and a retainer fitted over said piston, said resilient member being sandwiched between said retainer and said diaphragm.

13. A poppet valve according to claim 11, wherein said resilient member is made of synthetic rubber including acrylonitrile-butadiene rubber and urethane rubber, or natural rubber, and said valve is made of a synthetic resin including polytetrafluoroethylene or an elastomeric material including natural rubber or synthetic rubber.

14. A poppet valve according to claim 12, wherein said piston and said valve are coupled to each other for displacement in unison with each other, further comprising a damper disposed in said valve body for dampening shocks produced when said piston hits said valve body.

15. A poppet valve according to claim 12, wherein said valve body has a cylinder chamber defined therein above said piston, further comprising a spring disposed in said cylinder chamber for normally biasing said valve to be seated on said valve seat in an initial position, whereby said poppet valve is normally closed.

16. A poppet valve according to claim 12, wherein said valve body has a cylinder chamber defined therein below said piston, further comprising a spring disposed in said cylinder chamber for normally biasing said valve to be unseated from said valve seat in an initial position, whereby said poppet valve is normally open.

17. A poppet valve according to claim 11, wherein said communication passage includes a linear region extending from said primary port and having a first diameter and a region extending substantially perpendicularly to said linear region and having a second diameter, said second diameter being greater than said first diameter.

18. A poppet valve according to claim 11, wherein said resilient member comprises two separate members divided along said slit and fixed to each other, said separate members having the same hardness or different hardnesses, respectively.

19. A poppet valve according to claim 11, wherein said piston has a finger engaging said valve, said resilient member having a tapered surface on an inner circumferential surface thereof for receiving said finger when said finger is flexed.

* * * * *